United States Patent Office 2,989,170
Patented June 20, 1961

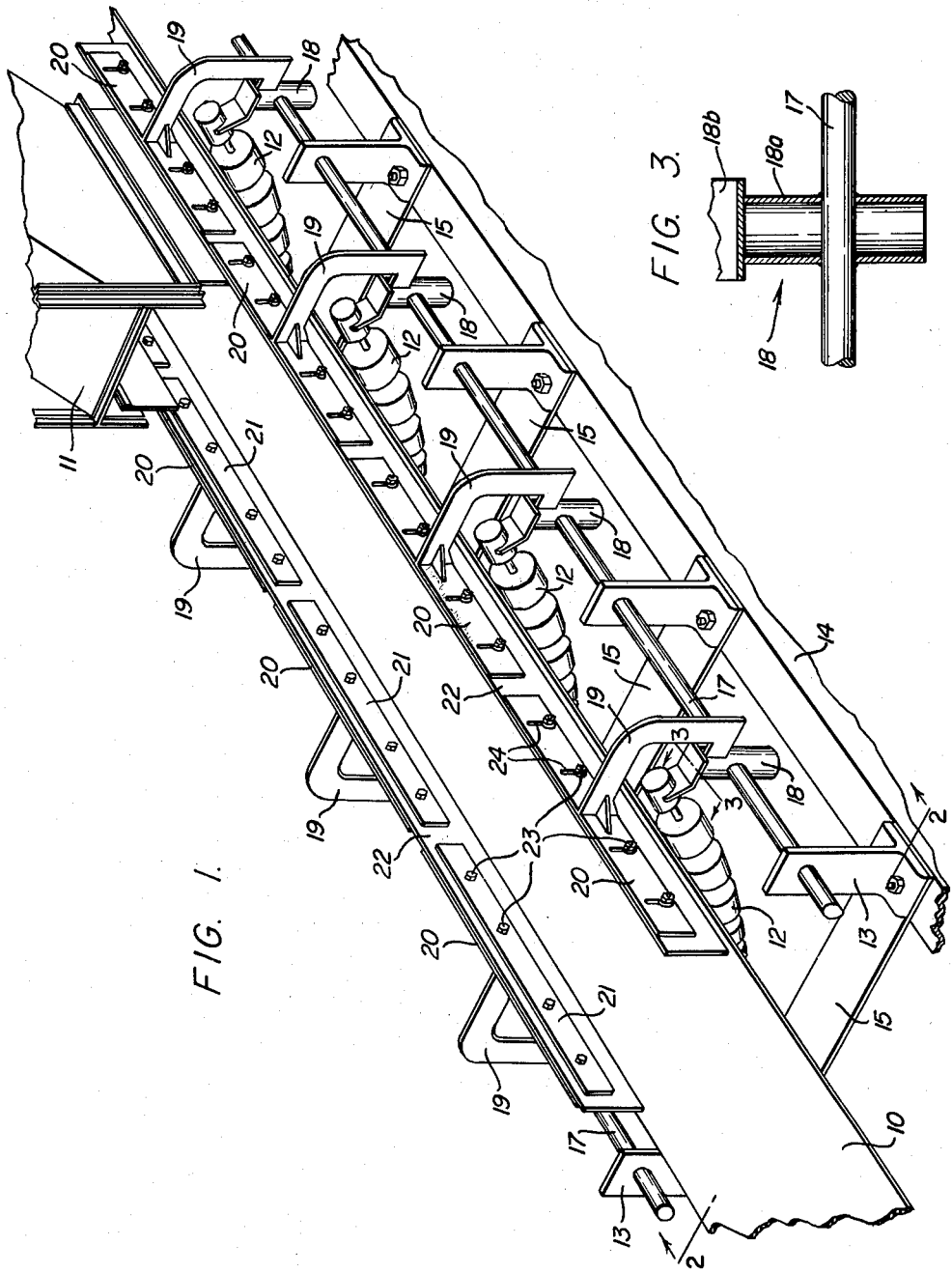

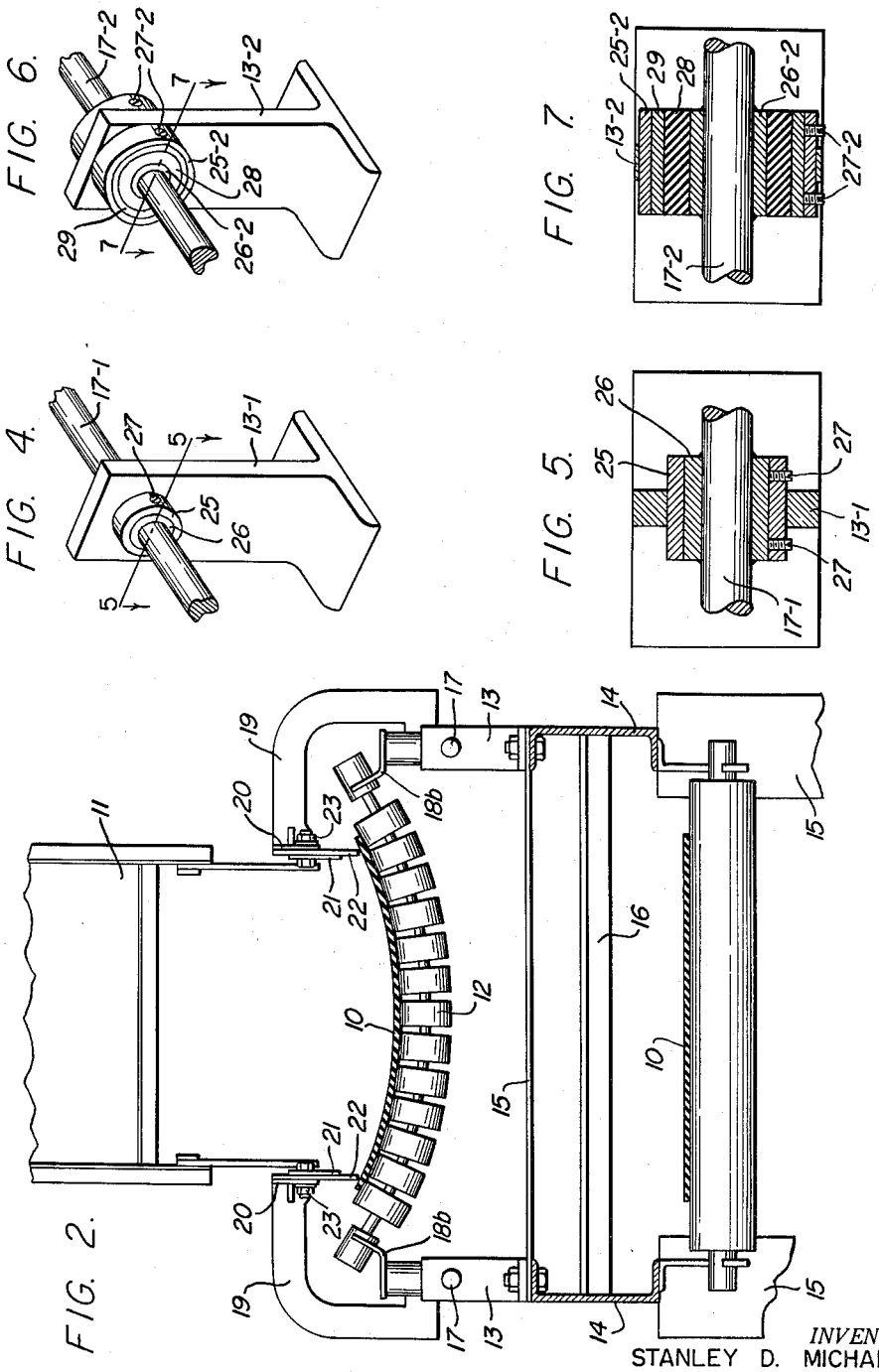

2,989,170
IMPACT-ABSORBENT SUPPORTING STRUCTURE WITH ARTICULATED SKIRT BOARDS FOR BELT-TROUGHING IDLERS

Stanley D. Michaelson and Robert E. Meyer, Salt Lake City, Utah, assignors to Kennecott Copper Corporation, New York, N.Y., a corporation of New York
Filed Nov. 2, 1959, Ser. No. 850,466
13 Claims. (Cl. 198—204)

This invention relates to structures for supporting endless conveyor belts as they transport material from one location to another, and is concerned particularly with impact-absorbent structures of this type for use at loading points where the material to be transported is dropped onto the conveyor belt.

Belt conveyor systems are widely used in industry for transporting materials of various kinds. In the mining and quarrying industries, especially, the material to be transported is usually exceedingly heavy. It is not often practical to gently load such material on the conveyor belt. Ordinarily, it is dropped onto the belt with damaging effect, and, while tough and strong belts are available, they can stand only so much abuse. Repairs and replacements are expensive.

Not only are the belts damaged at loading points, but the brackets upon which the belt-troughing idlers are mounted and even parts of the belt-troughing idlers themselves are often broken or damaged. Repairs and replacements necessitate frequent shut-downs and consequent loss in working time.

Modern types of belt-troughing idlers are inherently flexible to a limited extent in order to minimize belt damage and broken or damaged idler brackets and associated parts. While they have helped, they have by no means eliminated the problems. A more recent development is the impact bracket disclosed in U.S. patent application Serial Number 809,122, filed April 27, 1959, now Patent No. 2,974,777, by Donald G. Marsh. This has performed satisfactorily, but we have seen the possibility of accomplishing a generally similar result more effectively, with longer life for the component parts and a particularly advantageous tie-in with skirt boards, whereby compensating movement of the latter, equivalent to belt deflection upon impact, is obtained.

A feature of our invention is the use of torsion bars as a shock-absorbing agency, such bars being aligned longitudinally of the belt at opposite lateral sides thereof.

Another feature is the rigid mounting of skirt boards on the torsion bars by means of brackets which locate such skirt boards at the margins of the belt as protection against spillage and which cause them to automatically follow belt deflection upon impact.

Further objects and features of the invention will appear hereinafter in connection with the detailed description of the presently preferred embodiments illustrated in the accompanying drawings.

In the drawings:

FIG. 1 represents a fragmentary isometric view of a belt conveyor system, showing a material-loading position thereof in which is incorporated our impact-absorbent supporting structure for the belt idlers;

FIG. 2, a transverse section taken on the line 2—2 of FIG. 1;

FIG. 3, a fragmentary vertical section taken on the line 3—3 of FIG. 1, and drawn to an enlarged scale;

FIG. 4, an enlarged, fragmentary, isometric view showing a different type of connection between torsion bar and supporting standard, which provides for adjusting tautness of the belt idlers;

FIG. 5, a horizontal section taken on the line 5—5 of FIG. 4;

FIG. 6, a view similar to that of FIG. 5, but showing a type of adjustable connection which includes a resilient mounting for the torsion bar; and FIG. 7, a horizontal section taken on the line 7—7 of FIG. 6.

Referring to the drawings:

A conveyor belt 10, shown fragmentarily as a part of a belt conveyor system, is supported at and adjacent a loading chute 11 by means of belt-troughing idlers 12 of conventional type. These idlers 12 are supported by the impact-absorbent structure of the invention.

In the form illustrated, series or sets of standards 13 are provided at opposite sides of the belt 10, the individual standards of each set being spaced apart longitudinally of the belt so as to provide a standard at each side of an idler 12. It will be apparent to those skilled in the art that, for some installations, it will be desirable to arrange the structure in well known manner so that two or more idlers 12 may be supported by and between standards. In any event, longitudinal stringers 14, advantageously structural steel channels, as shown, resting on supporting piers 15, serve to support the respective sets of standards 13. Cross-members 15 and 16 serve to rigidly tie the stringers 14 together.

Extending longitudinally of belt 10 and mounted in the standards 13 are a pair of torsion bars 17, one at each side of the belt and each of length comprehending the several idlers 12. These torsion bars 17 extend through receiving openings provided in the upper ends of standards 13, and are welded rigidly to such standards so as to resist torsion imparted to them in a manner described below.

For receiving and supporting opposite ends of the several idlers 12, respective torsion-imparting means in the form of brackets 18 are rigidly secured to torsion bars 17 intermediate the standards 13. They are advantageously fabricated from respective lengths of pipe 18a, see particularly FIG. 3, provided with receiving openings through which the torsion bar extends, the pipe and the bar being joined rigidly by welding. Each pipe 18a is capped by an angular plate 18b, which serves to anchor an end of an idler 12 in conventional fashion.

It can be easily seen that downward deflection of belt 10 and of the several belt-troughing idlers 12 under impact of heavy material, such as chunks of ore or rocks, discharged by chute 11, will impart torsional forces to torsion bars 17 through brackets 18, which will be cushioned and absorbed by corresponding twisting of such torsion bars about their respective longitudinal axes as centers.

It is customary to utilize so-called "skirt boards" with belt conveyors at loading stations to prevent spillage of material from the belt as it is loaded thereon. One of the objects of this invention is to correlate skirt boards with the impact-absorbent structure, while one of the features is to do this most advantageously by utilizing the brackets 18 as articulative mountings therefor.

Thus, as illustrated, auxiliary brackets in the form of angular arms 19 are rigidly secured, as by welding, to the upper parts of the bracket 18, respectively, so as to extend upwardly and inwardly toward the belt 10 and overhang such belt along its longitudinal margins. Face plates 20, rigidly secured to the overhanging ends of such arms, and corresponding, free retainer plates 21 provide for mounting skirt boards 22 along the margins of the belt. The mounting is accomplished by means of bolts 23, which pass through suitable receiving openings provided in plates 21 and through elongate slots 24 in plates 20, so that periodical adjustments of the skirt boards downwardly may be made to compensate for wear. As is customary, the skirt boards are advantageously cut from salvaged conveyor belting. It is advantageous that elongate skirt boards be used, whose length is determined by the characteristics of the material being conveyed and the design of the chutes at the loading point.

It is apparent that, because of the torsion bar mounting above described, the skirt boards 22 will automatically follow downward deflection and upward return of belt 10 upon impact during loading.

One of the objects of the invention is to provide for easily adjusting the tautness of the several idlers 12. This may be accomplished by shimming the standards 13, but one of the features of the invention is to so secure the torsion bars 17 to the standards that the former may be rotated backwardly or forwardly about their respective longitudinal axes, as centers, relative to the latter and may be rigidly secured in any given position of adjustment.

To this end, the standards 13–1 FIGS. 4 and 5, may be provided with respective collars 25 extending from preferably both faces thereof, peripherally of the receiving openings for the torsion bars 17–1, and such receiving openings may be enlarged in diameter to closely accommodate respective collars 26 welded to the torsion bars at appropriate locations along their lengths. These inner collars 26 and the torsion bars 17 to which they are rigidly secured are free to rotate within and relative to the respective outer collars 25 and the respective standards 13–1 to which the latter are rigidly secured, thereby making the idlers 12 more or less taut in any desired degree. Rigid securement of the two collars to each other in the desired adjusted position of torsion bars to standards is accomplished by suitable fastening means, such as set screws 27.

Somewhat greater flexibility of torsion bar reaction to belt impact may be obtained by mounting the torsion bars in their supporting standards by means of rubber bushings. This is exemplified in the embodiment of FIGS. 6 and 7, where rubber bushings are employed in connection with the adjustable mounting just described. It should be realized, however, that rubber bushings may also be similarly employed in the non-adjustable construction of FIGS. 1–3 if desired.

As illustrated in FIGS. 6 and 7, a rubber bushing 28 is vulcanized to inner collar 26–2, which is welded or otherwise suitably secured to torsion bar 17–2 as inner collar 26 is to torsion bar 17–1 in the embodiment of FIGS. 4 and 5. Such rubber bushing 28 is also vulcanized to a second inner collar 29, which encircles it. This assembly is closely accommodated by the receiving opening and outer collar 25–2 of a standard 13–2, where it is free to rotate about the longitudinal axis of the torsion bar 17–2 to an adjusted position giving desired belt tautness. Set screws 27–2 lock such assembly and outer collar 25–2 together rigidly.

Whereas there are here illustrated and described certain preferred constructions which we presently regard as the best mode of carrying out our invention, it should be understood that various changes may be made without departing from the disclosed inventive subject matter particularly pointed out and distinctly claimed herebelow.

We claim:

1. Impact-absorbent supporting structure for belt-troughing idlers of a belt conveyor, comprising a pair of rigid, rectilinear, torsion bars; mutually spaced load-supporting means mounting said torsion bars, respectively, in mutually parallel relationship at opposite lateral sides and longitudinally of the belt of said belt conveyor, to resist torque applied by impact, said torsion bars being secured to each of their respective supporting means and extending continuously rigidly therebetween; and torque-imparting means rigidly secured to said torsion bars, respectively, for receiving and supporting opposite ends of respective belt-troughing idlers.

2. The structure of claim 1, wherein the means mounting the torsion bars are respective sets of standards, the standards of each set being spaced apart longitudinally of the belt with a torsion bar extending therebetween; and wherein the torsion-imparting, idler-supporting means are respective brackets, each bracket being rigidly secured to a torsion bar intermediate the standards of its mounting set of standards.

3. The structure of claim 2, wherein each bracket is provided with an auxiliary bracket extending rigidly therefrom upwardly and toward the belt; and wherein a skirt-board is attached to said auxiliary bracket so as to overhang the adjacent marginal edge portion of the belt and extend longitudinally therewith.

4. The structure of claim 3, wherein the skirt boards are attached to their auxiliary brackets by means affording height adjustability relative to the belt.

5. The structure of claim 12, wherein the torsion bars of said pair are disposed at respectively opposite lateral sides of the belt, each being of such length as to comprehend a plurality of belt-troughing idlers and a plurality of the mounting standards, and there being on each of said torsion bars a bracket and an auxiliary bracket for each of the belt-troughing idlers; and wherein there are skirt boards at opposite lateral sides of the belt, comprehending a plurality of said auxiliary brackets and being attached thereto.

6. The structure of claim 13, wherein the torsion bars of said pair are disposed at respectively opposite lateral sides of the belt, each being of such length as to comprehend a plurality of belt-troughing idlers and a plurality of the mounting standards, and there being on each of said torsion bars a bracket and an auxiliary bracket for each of the belt-troughing idlers; and wherein there are skirt boards at opposite lateral sides of the belt, comprehending a plurality of said auxiliary brackets and being attached thereto.

7. The structure of claim 1, wherein the means for mounting the torsion bars comprise rigid supports through which the torsion bars pass, and rubber bushings interconnecting said torsion bars and said supports.

8. Impact-absorbent supporting structure for belt-troughing idlers of a belt conveyor, comprising a pair of torsion bars; respective sets of standards at opposite sides of the belt of said belt conveyor, serving to support said torsion bars in mutually parallel relationship to resist torsion, the standards of each set being spaced apart longitudinally of the belt and having a torsion bar extending therebetween; adjustable means securing each torsion bar to its supporting standards; and respective bracket means rigidly secured to said torsion bars intermediate their lengths for receiving and supporting opposite ends of a belt-troughing idler.

9. The structure of claim 8, wherein the adjustable means securing each torsion bar to its standard comprises a collar rigidly secured to the standard, the torsion bar passing through the collar and being freely movable therein around its longitudinal axis; and fastening means for securing said collar and the torsion bar together in any adjusted position of the latter.

10. The structure of claim 9, wherein there is a collar encircling the torsion bar where it passes through the collar of the standard, and wherein a rubber bushing unites the former collar with the torsion bar.

11. In a belt conveyor system having a belt loading station, the belt being supported by belt-troughing idlers, impact-absorbent supporting structure for said idlers at said station, comprising idler supports at opposite sides of the belt; resilient cushioning means mounting said idler supports and providing for belt deflection upon impact; skirt boards at respective marginal edge portions of said belt; and bracket means rigidly mounting said skirt boards on said idler supports, so the skirt boards will automatically follow belt deflection upon impact.

12. Impact-absorbent supporting structure for belt-troughing idlers of a belt conveyor comprising a pair of torsion bars; sets of standards mounting said torsion bars, respectively in mutually parallel relationship at opposite, lateral sides and longitudinally of the belt of said belt conveyor to resist torsion, the standards of each set being spaced apart longitudinally of the belt with a torsion bar extending therebetween; brackets rigidly secured to said torsion bars, respectively, for receiving and supporting opposite ends of respective belt-troughing idlers; each bracket being rigidly secured to a torsion bar intermediate the standards of its mounting set of standards and having an auxiliary bracket extending rigidly therefrom, upwardly and toward the belt; and skirt-boards attached to the auxiliary brackets so as to overhang the adjacent marginal edge portion of the belt and extend longitudinally therewith.

13. The structure of claim 12, wherein the skirt-boards are attached to their auxiliary brackets by means affording height adjustability relative to the belt.

References Cited in the file of this patent

UNITED STATES PATENTS

| | | |
|---|---|---|
| 2,664,995 | Renner | Jan. 5, 1954 |
| 2,773,257 | Craggs et al. | Dec. 4, 1956 |
| 2,851,151 | McCallum | Sept. 9, 1958 |